Aug. 22, 1961 R. E. HALSTED 2,997,415

METHOD FOR MAKING FLEXIBLE LUMINESCENT, PHOTOCONDUCTING OR PHOTOVOLTAIC FILMS OF LARGE AREA

Filed April 20, 1959

Inventor:
Richard E. Halsted,
by John F. Ahern
His Attorney.

United States Patent Office 2,997,415
Patented Aug. 22, 1961

2,997,415

METHOD FOR MAKING FLEXIBLE LUMINESCENT, PHOTOCONDUCTING OR PHOTOVOLTAIC FILMS OF LARGE AREA

Richard E. Halsted, Burnt Hills, N.Y., assignor to General Electric Company, a corporation of New York Filed Apr. 20, 1959, Ser. No. 807,415
6 Claims. (Cl. 154—95)

This invention relates to continuous, crystalline, luminescent, photoconducting, and photovoltaic screens and more particularly to a method of forming such screens of large areas which provides direct access to both surfaces during formation.

Luminescent screens which are responsive to electromagnetic radiation, cathode ray bombardment, or electric fields to produce light have extensive applicability as visual indicators for information display or as lamps. Typical uses are as X-ray tube or cathode ray tube screens and as lamps for ordinary lighting. Photoconductive screens or area distributions of photoconductive materials having electrical conductivity dependent upon the intensity of incident radiation have applicability in the fabrication of radiation detection and electrical current control devices. Photovoltaic screens have applicability for electrical power generation from electromagnetic wave radiation in devices such as solar batteries.

In the production of such screens according to methods and techniques heretofore known, the luminescent, or photoconducting phosphors or materials or photovoltaic materials involved, all generically referred to herein as phosphors, are applied by evaporation or chemical reaction at raised temperatures, to substrate members in a manner which results in a permanent mechanical bond. Transparency, temperature stability and electrical insulation requirements generally dictate the use of vitreous ceramics as substrate materials. It is frequently a further requirement in the use of materials such as those of the zinc-cadmium sulfoselenide family including zinc sulfide, zinc selenide, zinc sulfoselenide, cadmium sulfide, cadmium selenide, cadmium sulfoselenide, zinc cadmium sulfide, zinc cadmium selenide, zinc cadmium sulfoselenide and any combinations or mixtures thereof, that the side of such material adjacent to the transparent substrate be accessible for applying an electrode thereto. In accordance with prior techniques, the application of such an electrode is prearranged by applying a film of titanium oxide to the transparent plate on which the material is superimposed. The titanium oxide reacts with the material to produce a conductive, transparent electrode between the material and transparent backing plate. Or, alternatively a conducting tin oxide ($SnO_2$) film is applied to the transparent plate on which the material is superimposed. Conductivity of this conducting film is retained if appropriate control of the phosphor material deposition is employed. In applying these materials to plates to form the screens according to these heretofore known techniques, however, the titanium oxide or tin oxide coated plate is required to be in an atmosphere of elevated temperatures for evaporation of the materials or in the atmosphere conducive to production of the vapor deposit as a reaction product. Such conditions are frequently detrimental to both the conducting coating and the material whereby a screen of inferior quality is often produced.

In addition to the foregoing, it is frequently advantageous to have access to the surface of the deposited material adjacent to the substrate for impurity diffusion and further to have a flexible screen or light source which may be distorted to conform to certain predetermined contours.

It is accordingly an object of my invention to facilitate the application of electrodes to phosphor screens without requiring intimate proximity of the electrodes and the material of the screen under conditions of elevated temperature and reactive atmosphere.

It is another object of my invention to facilitate the production of flexible luminescent, photoconducting and photovoltaic screens.

In accordance with the method of my invention, a phosphor material is applied to a refractory substrate as by vapor deposition and a supporting plastic film producing material is applied over the phosphor material on the substrate. The film with phosphor adhering to it, is thereafter peeled from the substrate to produce a screen comprising the plastic film with phosphor or other material adhering thereto. One side of the screen is exposed and accessible prior to application of the plastic film and the other side is exposed after the screen adhering to the plastic film is peeled from the substrate. Thus, during the process both surfaces of the phosphor material are successively exposed and accessible for application of an electrode or for other treatment. Suitable refractory substrate materials are tantalum, molybdenum or tungsten or other refractory material relatively inert with respect to the screen materials. The plastic film may be applied in liquid or flexible solid form after which the same may firm to a flexible solid state to facilitate peeling from the substrate. Alternatively, the substrate may be thin and flexible to facilitate such removal by peeling.

Figure 1:
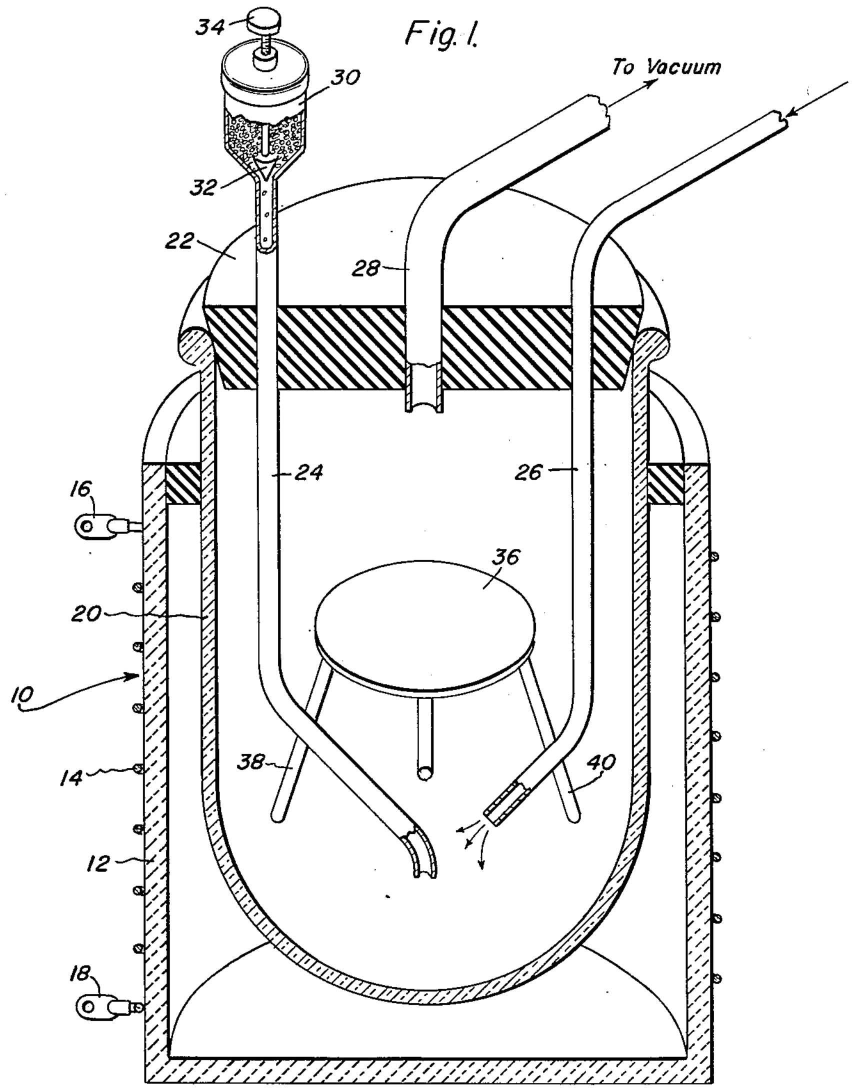
FIGURE 1 illustrates a vertical cross sectional view of an apparatus for producing a phosphor screen.

While the specification concludes with claims particularly pointing out and distinctly claiming the subject matter which I regard as my invention, it is believed the invention will be better understood with the following description taken in connection with the accompanying drawing in which FIGURE 1 of drawing illustrates one apparatus for carrying out my method.

For carrying out the first step of my process an apparatus shown in FIG. 1 of the drawing, and being generally of the type disclosed in the patent to Dominic A. Cusano et al., No. 2,675,331, granted April 13, 1954, and assigned to the present assignee, is employed. This apparatus is designated generally at 10 and includes a cup-shaped furnace 12 of a suitable refractory material having wound about the outer surface thereof a suitable heating coil 14 for raising the temperature of the confines of the furnace to desirable operating temperatures. For applying the electrical current to the heating element 14, a pair of lug terminals 16 and 18 are provided at respective ends thereof. Disposed within the furnace 12 is a tubular enclosure 20 of glass or the like material being closed at one end by a stopper or plug 22 having suitable apertures therein to accommodate respective conduits 24, 26 and 28. The conduit 24 is provided with a hopper 30 at one end thereof having a valve 32 positionable by an exterior screw 34, which is manually manipulable for controlling communication between the interior of the hopper and the conduit 24 proper. The other end of the conduit 24 terminates near the lower end of the tube 20. Contained within the hopper 30 is a plurality of pellets of material from which a suitable phosphor or other photovoltaic material may be formed and a suitable compound containing an activator for the phosphor. The flow of such pellets into tube 20 is controllable by valve 32. Conduit 26 also terminates at one end near the lower end of tube 20 and exteriorly is in communication with the source of gas, such as hydrogen sulfide, which is reactive with the pellets contained in hopper 30 for producing, under proper circumstances of temperature and on an appropriate substrate, a crystalline phosphor film. To facilitate evacuation of the tube 20 and continuous circulation of the hydrogen sulfide gas, an exhaust conduit 28 is provided which is in direct communication at one end with the interior of the tube 20 and exteriorly is in communication with a suitable vacuum pump.

Also contained within the tube 20 is a substrate 36 which may be of a suitable refractory metal such as tantalum, molybdenum or tungsten and which is mounted in spaced relationship from the end of the tube 20 on a tripod having legs such as shown at 38 and 40 which rest upon the interior rounded surface of the tube 20.

In carrying out one process of my invention, the furnace 12 is elevated to a temperature at which materials of the zinc-cadmium family readily react with selenides and sulfides. The interior of tube 20 is evacuated and pellets of the zinc-cadmium family are contained in hopper 30 and fed through tube 24 to the bottom of the tube 20. Simultaneously therewith, a gas of the sulfoselenide family, such as hydrogen sulfide gas is admitted through tube 26 to the interior of the tube 20. The gas is discharged in the region of the pellets which fall to the bottom of the tube 20 and at the temperature at which the furnace maintains the entire apparatus contained therein, vapor from the pellets reacts with the gas to produce, at the substrate 36, a phosphor such as cadmium sulfide. After a predetermined extent of reaction, a phosphor deposit of sufficient thickness is produced on substrate 36 and thereafter the entire apparatus is allowed to cool to room temperature.

Suitable temperatures for the phosphors of the zinc-cadmium sulfoselenide family may be from 400° C. to 600° C. at which temperatures a proper crystal structure of the film is assured. The deposition procedure is conducted for a period sufficiently long to coat the substrate to the desired thickness.

While the vapor deposition step of the process has been described as being that of a controlled reaction of phosphor producing materials, it is also within the purview of my invention to achieve an appropriate deposit of phosphor film on the substrate by evaporation procedures as set forth, for example, in Patent No. 2,867,541, granted to Henry D. Coghill and Lewis R. Koller on January 6, 1959, or as set forth in the application of Lewis R. Koller and Henry D. Coghill, Serial No. 641,986, filed February 25, 1957, now Patent No. 2,967,111, and assigned to the present assignee. Any other phosphor film deposit procedures may be used.

Figure 2:
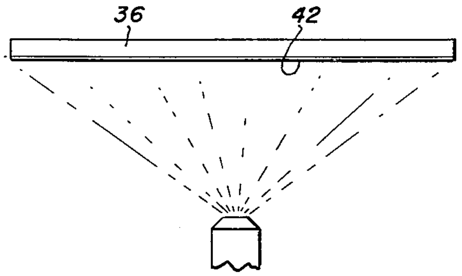
FIGURE 2 illustrates a device for spraying resin over the screen formed in the apparatus illustrated in FIGURE 1.

In conducting the second step of the process as shown in FIG. 2 of the drawing, the substrate 36 is mounted on a suitable pedestal or other supporting structure. A supporting film may be sprayed on the phosphor deposit in a fluent state and exposed to atmosphere allowing the same to firm and form a solid, flexible film 42 by evaporation. Suitable materials for forming such supporting films include a transparent dielectric resinous composition composed of 70 parts, by weight, of nitrocellulose and 30 parts, by weight, of a castor oil modified glyceryl-phthalate alkyd resin. Alternatively, epoxy resins such as Epon 828 with 8 percent, by weight, diethylenetriamine, or a thermosetting glyceryl-phthalate resin may be employed. The film thickness may be varied widely according to the requirements of the screen produced.

In the event that an inorganic film is desired or required, a low melting glass cloth may be applied to the deposited crystalline phosphor film. In the application of the glass cloth or even the application of certain ceramic or plastic film materials, it may be necessary to apply the same to a substrate in a heated condition thereof. In such an event, the substrate 36 would be disposed adjacent to any source of heat such as a resistance heating wire and the substrate maintained at an elevated temperature while the spraying or application of the film is carried out.

In the firmed condition of the supporting film the screen material deposited is more strongly adherent to the supporting film than to the substrate 36 whereby the removal of the film by peeling is effective to remove also the screen material deposit thus yielding a plastic film coated with screen material. In other words, a luminescent, photoconducting or photovoltaic screen on a supporting film is formed.

While the invention has been set forth hereinabove with respect to the general practice thereof, the following specific example is given in order that those skilled in the art may determine specific circumstances under which the invention may be practiced. This example is set forth in an illustrative manner only and is not to be construed in a limiting sense.

A tantalum substrate was enclosed in an evacuated chamber as shown in FIG. 1 of the drawing and the interior of the tube 20 was evacuated to a pressure of the order of one micron of mercury and heated by the furnace 14 to a temperature of approximately 600° C. Cadmium vapor was produced by feeding pellets of cadmium metal and activator quantities of copper chloride, from the hopper 30 progressively until approximately 5 grams thereof were deposited in the bottom of the tube 20 and the same were vaporized by the heat of the furnace. Simultaneously, hydrogen sulfide gas was fed through the conduit 26 and discharged in the region of the vaporized cadmium. The vaporized cadmium and hydrogen sulfide reacted to produce cadmium sulfide on the surface of the substrate to a thickness of approximately 10 microns and thereafter the entire apparatus was allowed to cool to room temperature. This evaporation procedure was conducted for a period of approximately 40 minutes.

As the second step of the process shown in FIG. 2 of the drawing, the previously mentioned transparent dielectric resinous composition was sprayed at room temperature over the vapor deposit and the resinous composition was then maintained exposed to air at room temperature and allowed to form a solid film. This supporting film which was approximately one mil in thickness was thereafter peeled from the substrate with the phosphor adhering thereto to provide a photoconducting screen.

While the invention has been described with respect to particular examples in the foregoing disclosure many modifications and changes will immediately occur to those skilled in the art without departing from the invention. Accordingly, I intend by the appended claims to cover all such modifications and changes as fall within the true spirit and scope of the foregoing disclosure.

What I claim as new and desire to secure by Letters Patent of the United States is:

1. The method of forming a flexible, self-supporting phosphor screen comprising the steps of depositing from a vapor phase, a phosphor material on a strip of substrate material, applying a backing layer adherent to the phosphor film on the exposed side thereof, peeling the backing layer with said phosphor material adherent thereto from said substrate.

2. The method of forming a flexible, self-supporting phosphor screen comprising the steps of heating a smooth-surfaced refractory substrate, depositing from the vapor phase, a light producing phosphor material on said substrate in a heated condition thereof to form a crystalline structure, removing the coated portion of said strip from heat to allow the same to cool, applying in the fluent state a coating of a flexible, translucent film on said vapor deposit, allowing said flexible film to set, and peeling the composite vapor deposit and plastic film from said substrate to form a flexible screen.

3. The method of forming a flexible, self-supporting phosphor screen comprising the steps of depositing from the vapor phase, a phosphor material on a smooth-surfaced refractory substrate heated to a temperature to form a crystalline structure of said vapor deposit, applying in the fluent state a flexible, translucent backing to said vapor deposit which is adhesive thereto, allowing said flexible backing to set, and peeling the formed composite vapor deposit and backing from said substrate.

4. The method of forming a flexible, self-supporting phosphor screen comprising the steps of heating a smooth-surfaced refractory substrate to a temperature sufficiently high to form a crystalline structure of a phosphor deposited thereon, depositing a phosphor of the zinc-cadmium sulfoselenide family to effect a condensation thereof on said substrate, superimposing in the fluent state a supporting film on said vapor deposit on said substrate, allowing said supporting film to set, and peeling the formed composite film from said substrate to form a screen.

5. The method of forming a flexible, self-supporting phosphor screen comprising the steps of depositing a phosphor material on a substrate to form a phosphor film accessible on one side thereof, applying in the fluent state a backing layer adherent to the phosphor film on the exposed side thereof, allowing said backing layer to set and peeling the backing plate with the phosphor material adherent thereto from said substrate to expose and make accessible the other side of said phosphor film.

6. The method of forming a flexible, self-supporting phosphor screen comprising the steps of applying in the fluent state a backing plate to a phosphor coated substrate, allowing said backing layer to set, and peeling the backing plate with the phosphor material adherent thereto to form said substrate.

References Cited in the file of this patent

UNITED STATES PATENTS

| | | |
|---|---|---|
| 2,626,226 | Adair | Jan. 20, 1953 |
| 2,719,805 | Bennes | Oct. 4, 1955 |
| 2,867,541 | Coghill | Jan. 6, 1959 |